H. W. CHRISTIAN.
ELECTRIC WATER HEATER.
APPLICATION FILED SEPT. 7, 1920.
1,400,526.
Patented Dec. 20, 1921.
2 SHEETS—SHEET 1.
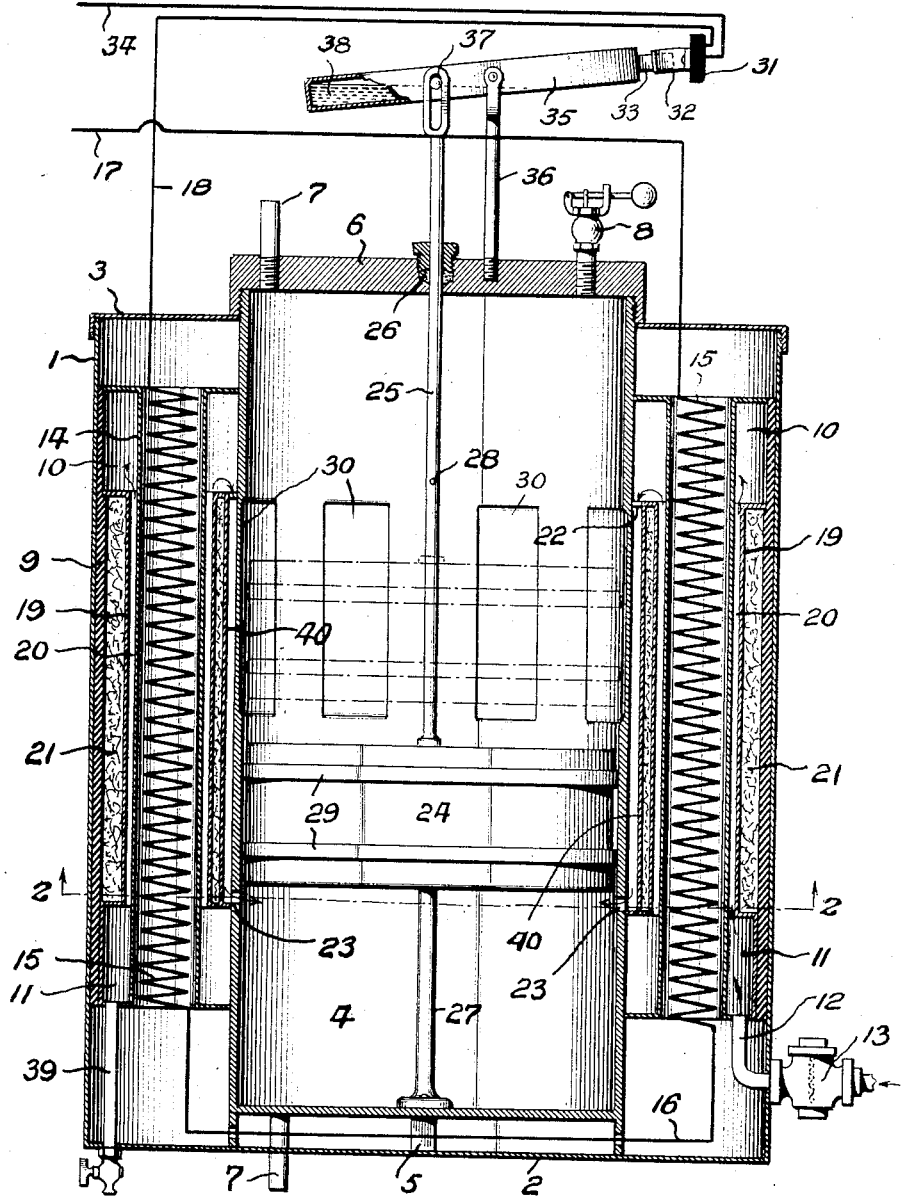
Fig. 1.
Inventor
Herbert W. Christian,
By 
Attorneys Inventor
Herbert W. Christian

UNITED STATES PATENT OFFICE.

HERBERT W. CHRISTIAN, OF DETROIT, MICHIGAN.

ELECTRIC WATER-HEATER.

1,400,526.  Specification of Letters Patent.  Patented Dec. 20, 1921.

Application filed September 7, 1920. Serial No. 408,606.

*To all whom it may concern:*

Be it known that I, HERBERT W. CHRISTIAN, a citizen of the United States of America, residing at Detroit, in the county of Wayne and State of Michigan, have invented certain new and useful Improvements in Electric Water-Heaters, of which the following is a specification, reference being had therein to the accompanying drawings.

This invention relates to an instantaneous electric water heater and has special reference to that class of heaters wherein water flows exteriorly of an electric heating element in contradistinction to flowing through an electrically heated element. In the former it is possible to provide a large heating surface and spread the water out as a film so that it may be more quickly heated, whereas in the latter the volume of water is such as to prohibit instantaneous heating under ordinary conditions.

The primary object of my invention is to provide an electrically operated heating apparatus through which water may flow in the form of a film and be quickly and economically heated. The water may be conducted about a multiplicity of heating elements or caused to flow against the walls of a cylindrical heating element, either form permitting of the apparatus being compactly constructed, especially when including a reservoir about which the heating element or elements may be disposed.

Another object of this invention is to provide an electrically operated water heating apparatus wherein a float, within a reservoir, controls the use of current in connection with the apparatus, thus practically avoiding waste of current, over boiling or the generation of steam.

A further object of my invention is to provide an electric water heating apparatus wherein the parts are constructed so as to be easily assembled and permit of easy access being had to the various parts of the apparatus for cleaning or repair purposes, if necessary, and the construction entering into the apparatus will be hereinafter described and then claimed.

Reference will now be had to the drawings, wherein—

Figure 1 is a vertical sectional view of the apparatus, and

Figure 2:
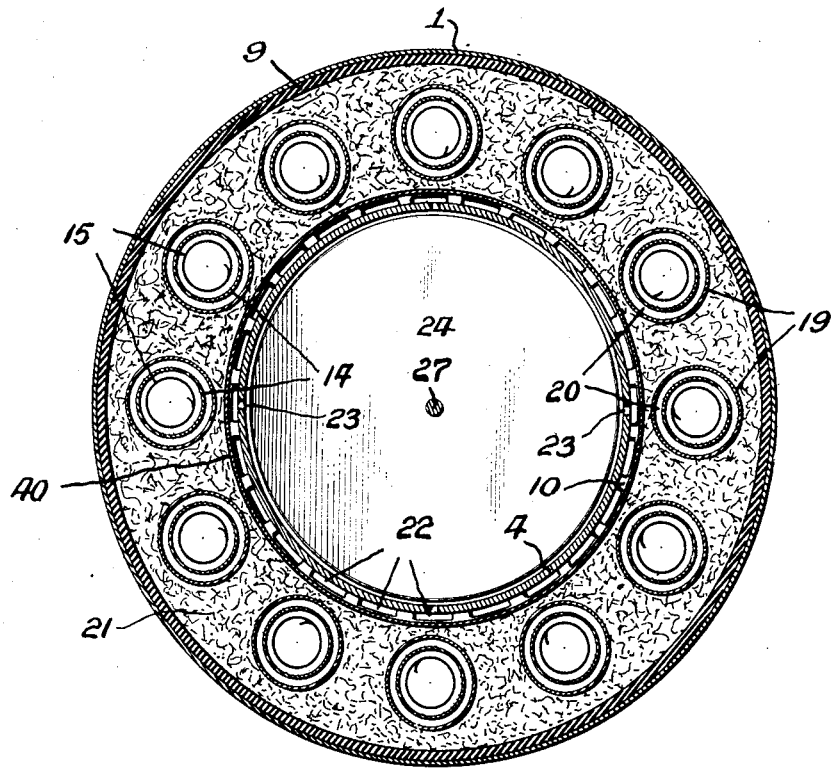
Fig. 2 is a horizontal sectional view taken on the line 2—2 looking in the direction of the arrows.

In the drawings, the reference numeral 1 denotes a cylindrical casing having a bottom wall 2 and a detachable cover 3, said cover having a central opening providing clearance for a cylindrical reservoir 4 which may rest on the bottom wall 2 or be supported therefrom by feet 5. The upper end of the reservoir protrudes above the cover 3 and is normally closed by a detachable lid 6. This lid and the bottom wall of the reservoir may have outlet pipes 7 and the lid may have a conventional form of safety valve 8. Either of the outlet pipes 7 may be used for withdrawing warm water from the reservoir 4 and the valve 8 is simply provided as a safety factor.

In the casing 1 is placed a lining 9 preferably made of asbestos or any suitable insulation material and suitably supported at the upper and lower ends of the lining is an upper water chamber 10 and a lower water chamber 11. These chambers are somewhat in the form of drums which surround the reservoir 4 and the lower water chamber 11 is adapted to receive cold water from a suitable supply pipe 12 which may be provided with a strainer or filter 13 of a conventional form.

Connecting the upper and lower water chambers and extending therethrough are electrically operated heating elements 14, preferably in the form of circumferentially disposed vertical tubes containing resistance coils 15 electrically connected in series, as at 16, and having leading out wires 17 and 18. The space between the lower water chamber 11 and the bottom wall 2 provides sufficient clearance for the series connections and the leading out wires 17 and 18 may extend through the cover 3 or any insulator connected to the casing or its cover. The walls of the vertical tubes are adapted to be heated by the resistance coils and said coils may be suitably arranged and supported within the tubes.

Connecting the lower wall of the upper water chamber 10 to the upper wall of the lower water chamber 11 are water conduits 19 which surround the electric heating elements and provide cylindrical passages 20 for water which flows, under pressure, from the lower water chamber 11 to the upper water chamber 10. The walls of the conduits 19 are very close to the walls of the heating elements so that the passages 20 simply accommodate small quantities or films of water which contacting with the walls of the heating elements are heated by conduction. While the conduits 19 afford individual water passages about each heating element, it is still within the scope of my invention to substitute two cylindrical shells, one within the other, to afford an annular water passage and it is obvious that the tubes of the heating elements may take on a different shape so as to maintain the water in a film to be easily attacked. In such form it is possible to heat the water to a high temperature before it escapes from a conduit into the upper water chamber 10.

Surrounding the reservoir 4 and connecting the upper and lower water chambers 10 and 11 respectively is a shell 40 and between said shell and the lining 9 is placed insulating material 21, as asbestos or mineral wool. The insulating material is packed around the water conduit 19 and assists in maintaining the water conduits in position relative to the upper and lower chambers and the shell 40 connecting said chambers.

The bottom wall of the upper water chamber 10 has a series of slots or openings 22 at the wall of the reservoir 4 so that the contents of the upper chamber 10 may flow downwardly between the shell 40 and said reservoir. The wall of the reservoir, adjacent the lower water chamber 11 has a plurality of openings 23 permitting of the water flowing into the bottom of the reservoir where it accumulates and may have heat conducted thereto, through the reservoir wall by the heated water in the passage of the shell 40.

Slidable in the reservoir 4 is a float 24 having a rod 25 sliding through a conventional form of stuffing box 26 carried by the lid 6. The downward movement of the float 24 is limited by a stop 27 on the bottom of the reservoir 4 and the upward movement of said float is limited by a pin or stop 28 carried by the rod 25 and adapted to impinge against the lid 6. The float 24 is of a conventional hollow form buoyant on the water within the reservoir and said float may have guide or packing rings 29 bearing against the reservoir walls until the float is elevated, when water may pass above the float in a plurality of grooves 30 in the reservoir wall. The packing rings or the recess may not be necessary when the heated water is withdrawn from the bottom of the reservoir.

The float rod 25 is adapted to actuate an electric switch which for the purposes of illustration has been shown as including an insulated support 31 for resilient contact members 32 adapted to be engaged by a blade 33 coöperating with the contact members 32 in providing a knife switch. One of the contact members 32 is connected to the leading out wire 18 and the other contact member 32 has a leading out wire 34 which follows the leading out wire 17 to a suitable source of electrical energy, as an ordinary electric lighting circuit.

The switch blade 33 is carried by a fulcrumed arm 35 preferably supported by an upright 36 of the lid 6, and the arm 35 has a pin and slot connection 37 with the upper end of the float rod 25. As shown, the arm 35 is preferably hollow or in the form of a receptacle containing a counterbalance weight 38 which may be in the form of a movable body of liquid, as mercury. The arm 35 is disposed so that it is overbalanced, especially by the counterweight, with the switch closed, and after a predetermined movement of the float 24 the rod 25 thereof elevates the inner end of the arm 35 causing the counterweight to shift to the outer end of the arm and thus produce a quick opening of the switch. This will prevent arcing at the contacts of the switch that otherwise might occur if the arm is slowly actuated by the float rod, but I have simply illustrated this form of switch and arm as an example of a quick make and break circuit controlling device that may be actuated, directly or indirectly, from the float rod. It is believed that in the majority of installations the switch will be located at some more convenient place than above the apparatus for in all probability the apparatus will be placed at an elevation to permit of water flowing by gravity from the reservoir.

The apparatus may be designed to hold a predetermined quantity of hot water and the flow of water to and from the apparatus will be regulated or controlled by ordinary valves (not shown). Should the apparatus contain a quantity of cold water the water is drained off and a fresh supply of water admitted to the apparatus. When the cold water is drained off the float 24 is lowered and the electric switch closed so that the inflowing water will be heated. The heating of the water will continue as long as water is withdrawn from the apparatus and to discontinue heating water it is only necessary to shut off the outflowing warm water at which time the supply of water in the reservoir will raise the float and open the switch. The apparatus will then remain dormant even though the supply of water thereto is not shut off, as the apparatus will simply contain a cold body of water which may be run off to obtain a warm supply of water. The lower water chamber 11 may be provided with a drain or clean out connection 39, especially when the water is not filtered, and while in the drawings there is illustrated a preferred embodiment of my invention, I would have it understood that the structural elements are susceptible to such changes as fall within the scope of the appended claims.

What I claim is:—

1. A water heating apparatus comprising an electric heating element, means to maintain a film of water about said heating element, and means actuated by a predetermined quantity of heated water to control the operation of said electric heating element.

2. A water heating apparatus as in claim 1, characterized by the last mentioned means including a reservoir and a float actuated switch.

3. A water heating apparatus as in claim 1, characterized by the first mentioned means including concentric tubular members between which the water flows.

4. A water heating apparatus comprising upper and lower water chambers, conduits connecting said chambers so that water may flow from one chamber to the other, and electrically operated heating elements in said conduits.

5. A water heating apparatus as in claim 4, characterized by the heating elements being approximately the size of said conduits to cause the water to flow as a film between said conduits and said heating elements.

6. A water heating apparatus as in claim 4, characterized by a reservoir about which the chambers and conduits are disposed and supply water thereto.

7. A water heating apparatus comprising a reservoir, upper and lower water chambers, a conduit connecting said chambers and through which water flows from one chamber to the other, an electrically operated heating element in said conduit and against which water is maintained in the form of a film by said conduit, and means adapted to conduct water from one of said chambers to said reservoir and against the outer wall of said reservoir.

8. A water heating apparatus as in claim 7, characterized by a switch controlling the operation of said heating element, and means in said reservoir adapted to actuate said switch.

9. A water heating apparatus comprising a reservoir, upper and lower water chambers about said reservoir, conduits disposed about said reservoir and communicating with said chambers, electrically operated heating elements in said conduits and connected in series, a switch in circuit with said heating elements, means establishing communication between said reservoir and one of said chambers so that said reservoir may receive warm water from said chamber, and a float in said reservoir adapted to actuate said switch.

10. A water heating apparatus as in claim 9, characterized by the said means including a shell about said reservoir to provide a water passage against the walls of said reservoir.

11. A water heating apparatus comprising a reservoir, a shell, a conduit and a heating element disposed in parallelism to provide passages between said reservoir and said shell and between said conduit and said heating element in which water may flow as a film and enter said reservoir; and means controlling the operation of said heating element.

12. A water heating apparatus including an electric heating element, and means to cause a film of water to flow longitudinally of said electric heating element against the outer walls thereof so as to be heated by conduction during its flow against said electric heating element.

13. An instantaneous water heater comprising an electric heating element, means to conduct a film of water against said heating element and means constructively arranged to be actuated by water within the heater to control the operation of said electric heating element.

14. Means adapted for heating a liquid comprising walls providing a passage so narrow that the liquid in the passage is in the form of a film that may be heated by conduction through one of said walls, and electric heating means for one of said walls.

15. An instantaneous liquid heater comprising a wall, means to maintain a film-like formation of liquid at the wall to be heated thereby, and electric heating means for the wall.

In testimony whereof I affix my signature in presence of two witnesses.

HERBERT W. CHRISTIAN.

Witnesses:
WILLIAM C. BLYTH,
ANNA M. DORR.